Dec. 8, 1964   R. T. GALLOWAY   3,160,878
STEERING INDICATOR FOR RANGE-BEARING NAVIGATION SYSTEM
Filed Jan. 25, 1962   2 Sheets-Sheet 1

INVENTOR.
Richard T. Galloway
BY
Rolla N. Carter
Attorneys

Dec. 8, 1964  R. T. GALLOWAY  3,160,878
STEERING INDICATOR FOR RANGE-BEARING NAVIGATION SYSTEM
Filed Jan. 25, 1962  2 Sheets-Sheet 2

INVENTOR.
Richard T. Galloway
BY
Been N. Carter
Attorneys

United States Patent Office 3,160,878
Patented Dec. 8, 1964

3,160,878
STEERING INDICATOR FOR RANGE-BEARING NAVIGATION SYSTEM
Richard T. Galloway, Panama City, Fla., assignor to the United States of America as represented by the Secretary of the Navy
Filed Jan. 25, 1962, Ser. No. 168,851
3 Claims. (Cl. 343—5)
(Granted under Title 35, U.S. Code (1952), sec. 266)

The invention described herein may be manufactured and used by or for the Government of the United States of America for governmental purposes without the payment of any royalties thereon or therefor.

The present invention relates to navigating a ship and more particularly to a system for providing steering information for a helmsman following a track having a selected relation to a fixed reference point.

The invention is of special utility in the arts of mine hunting and mine sweeping where it is desired to make successive runs along parallel tracks transversely separated by a few hundred feet so as to insure a reasonably complete coverage of a certain area.

In mine countermeasure operations a ship is steered by the helmsman who receives course changes from a conning officer who observes plotted positions of the ship. Ship position information is available to the conning officer only after a fix has been plotted so that the instructions transmitted to the helmsman are "out-of-date" when received. Accordingly, an object of the invention is to provide a helmsman with steering information which is current.

Another object of the invention is to increase the preciseness of navigation by increasing the accuracy with which a ship may be steered along a desired track.

Other objects and advantages of the invention will appear more fully in connection with the following description when read in connection with the accompanying drawings in which.

Figure 2:
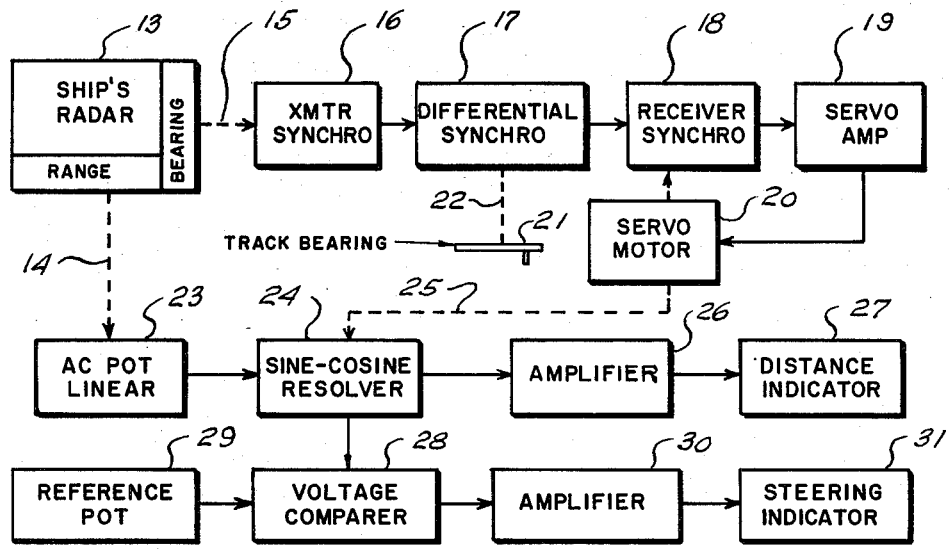
FIG. 2 is a block diagram of a preferred embodiment of the invention.
Figure 1:
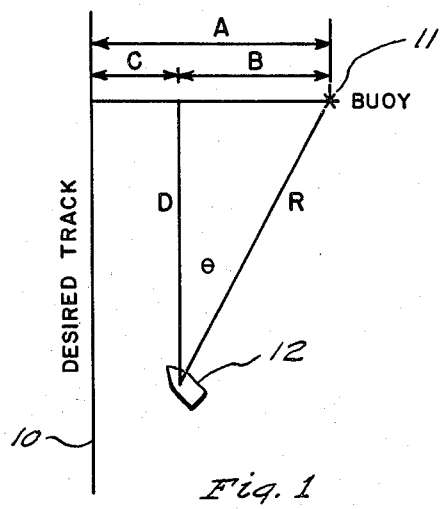
FIG. 1 shows the geometry utilized by the system of FIG. 2.

The geometry utilized by the system of FIG. 2 is shown in FIG. 1 wherein the desired track 10 of known bearing to be followed lies along a straight line spaced a known distance A from a buoy 11 or other fixed reference point. The helmsman on a ship 12 desiring to follow the track 10 determines the range R and the bearing of the buoy 11 and from this information, in accordance with the invention, he determines the distance D and the angle $\theta$ from which he determines the distance C he is from the track 10 and steers his ship 12 to bring this distance C indication to zero. From an inspection of FIG. 1 it will be apparent that the distance D is the distance between the ship 12 and the perpendicular from the buoy 11 to the track 10, the angle $\theta$ is the difference between the bearing of the track 10 and the bearing of the buoy 11 with respect to the ship 12. It can be seen from FIG. 1 and from trigonometric considerations that:

$$B = R \sin \theta$$
$$D = R \cos \theta$$

and $$C = A - B$$

A preferred embodiment for practicing the invention is shown in FIG. 2 as comprising a radar equipment 13 of known type which provides in angular positions on shafts 14 and 15, respectively, the range and bearing of the buoy 11. The shaft 15 containing bearing information is mechanically connected to a transmitting synchro 16 which is electrically connected through a differential synchro 17 to a receiving synchro 18, the output of which is connected through a servo amplifier 19 to a servo motor 20. A shaft of the servo motor 20 is mechanically connected to the receiver synchro 18, the arrangement comprising a nulling system as is well-known. The bearing along the track 10 is inserted into the differential synchro 17 by a crank 21 and its associated shaft 22 so that the null position of the servo motor 20 corresponds to the angle $\theta$. The shaft 14 containing information of range to the buoy 11 is mechanically connected to an A.C. linear potentiometer 23, the output of which is electrically connected to a sine-cosine resolver 24 which has a mechanical input of the angle $\theta$ in the form of the angular position of a shaft 25 of the servo motor 20. The electrical output of the resolver 24 corresponding to $R \cos \theta$ is fed through an amplifier 26 to an indicator 27 which suitably displays the distance D to the helmsman. The electrical output of the resolver 24 corresponding to $R \sin \theta$ is compared in a voltage comparer 28 with a reference voltage corresponding to the known distance A provided by a manually set reference potentiometer 29. The output of the comparer 28 is fed through an amplifier 30 to a suitable steering indicator 31 which may be a meter which deflects in the direction the ship should be steered and of a magnitude approximating the distance C.

In using the invention to follow the desired track 10 the crank 21 is turned to the known value of the track bearing, the reference potentiometer 29 is set to provide a voltage corresponding to the known distance A, the radar 13 continuously provides range and bearing of the buoy 11 in the angular positions of the shafts 14 and 15 and the helmsman steers the ship 12 to maintain the steering indicator 31 at its position corresponding to "on track" position, the indicator 27 of the distance to go to be athwart the buoy 11 being a useful aid.

Figure 3:
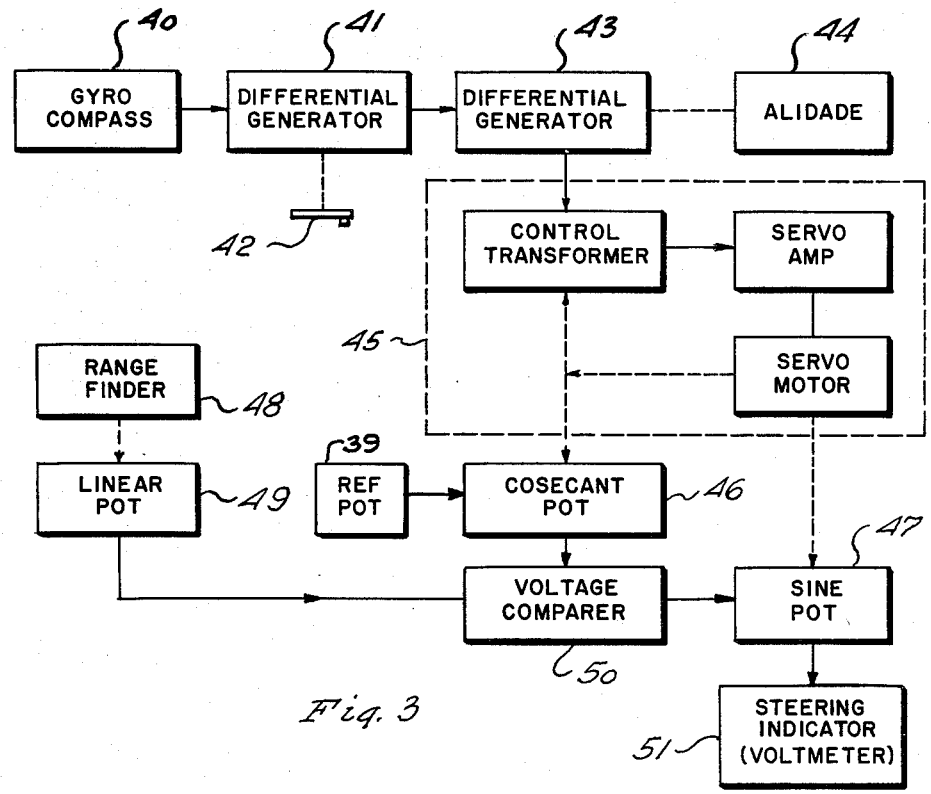
FIG. 3 is a block diagram of another embodiment of the invention.
Figure 4:
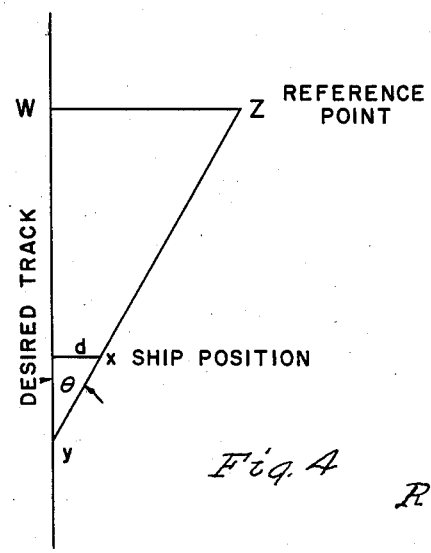
FIG. 4 shows the geometry utilized in the embodiment of FIG. 3.

In FIG. 3 is shown another embodiment for practicing the invention which provides a steering indication for the helmsman without requiring that the ship be radar equipped. In this system, the same problem is solved but in the somewhat different manner indicated in FIG. 4 where it is the distance $d$ which is to be indicated to the helmsman by some readily understood display. In operating in accordance with FIG. 4 one measures the distance $xZ$ from the ship to the reference point, which may be the buoy 11 of FIG. 1, determines the distance $yZ$ from the desired track 10 to the reference point corresponding to the angle $\theta$, computes the difference $xy$ between these two distances, multiplies this difference distance $xy$ by sine $\theta$ and indicates the resultant product as the distance $d$, the distance WZ being known.

The apparatus for accomplishing the foregoing shown in FIG. 3 comprises a gyro compass 40, the synchro signals from which are applied to a differential generator 41 into which has been inserted by a crank 42 the bearing along the desired track 10. The output signal from the generator 41 is applied to a second differential generator 43 which is controlled by an alidade 44 sighted on the reference point Z. The signal output from the second differential generator 43 corresponds to the angle $\theta$ and is utilized through a servo system 45 to set the angles of rotation of a cosecant potentiometer 46 and a sine-potentiometer 47, respectively. The voltage outputs of the potentiometers 46 and 47 will be proportional, respectively, to the cosecant of angle $\theta$ and the sine of angle $\theta$. Inasmuch as the distance $yZ$ is equal to WZ cosec $\theta$, the voltage output of the cosecant potentiometer 46 may be calibrated to represent the distance $yZ$ for any track, the tracks being changeable by switching a different voltage across the potentiometer 46 as by a suitable reference potentiometer 39. A voltage proportional to the distance to the reference point Z is obtained from a linear potentiometer 49, mechanically connected to the range control element of a range finder 48 which voltage is then compared in a comparison circuit 50 to the voltage from the cosecant potentiometer 46 and the difference which is proportional to the distance $xy$ is applied to the sine potentiometer 47. The output of the sine-potentiometer 47, being its input voltage reduced by the sine of the angle $\theta$ and proportional to the distance $d$, is applied to a steering indicator 51 which, for example, may be a voltmeter calibrated in yards.

When utilizing the apparatus of FIG. 3 for successively sailing along transversely spaced parallel paths, the navigator need only adjust the reference potentiometer 39 by an amount corresponding to the desired path separation and instruct the helmsman to steer the ship as before to maintain as closely as possible the steering indicator 51 at a selected reading which normally will be zero with right and left deviations from the desired track being plus and minus, respectively. If the navigator is also the conning officer, he is not absolutely required to take any action while following the desired track but he will, of course, normally, carefully and somewhat leisurely keep a plot of the course, as shown by occasional fixes, for record purposes and also to serve as a check on the steering performance of the helmsman.

While for the purpose of disclosing the invention two embodiments thereof have been described in detail, it will be obvious to those skilled in this art that many modifications may be made without departing from the spirit of the invention, the scope of which is pointed out in the appended claims.

What is claimed is:

1. A ship navigation system comprising in combination,
    a gyro compass,
    a first differential generator having a pair of inputs and an output with one of said inputs coupled to the output of said gyro compass and the other input responsive to a signal representing the bearing along a predetermined desired track,
    a second differential generator having a pair of inputs and an output with one of said inputs coupled to the output of said first differential generator,
    an alidade connected to the other input of said second differential generator,
    a servo system connected to the output of said second differential generator,
    a range finder,
    a linear potentiometer coupled to the output of said range finder,
    a reference potentiometer,
    a cosecant potentiometer having a pair of inputs and an output with one of said inputs coupled to the output of said reference potentiometer and the other input connected to the output of the aforesaid servo system,
    a voltage comparer having a pair of inputs and an output with one of said inputs coupled to the output of said linear potentiometer and the other of said inputs connected to the output of the aforesaid cosecant potentiometer,
    a sine potentiometer having a pair of inputs and an output with one of the inputs thereof coupled to the output of said voltage comparer and the other input thereof connected to the aforesaid servo system, and
    a steering indicator voltmeter connected to the output of said sine potentiometer.

2. A ship's navigation system comprising in combination,
    a radar system for providing range and bearing representative signals of target objects,
    a transmitting synchro coupled to the bearing signal output of said radar system,
    a differential synchro having a pair of inputs and an output with one of said inputs coupled to the output of said transmitting synchro and the other input responsive to a signal representing the bearing along a predetermined desired track,
    a receiver synchro having a pair of inputs and an output with one of the inputs thereof coupled to the output of said differential synchro,
    a servo amplifier coupled to the output of said receiver synchro,
    a servo motor having an input and a pair of outputs with said input coupled to the output of said servo amplifier and one of the outputs thereof connected to the other input of the aforesaid receiver synchro,
    an A.C. linear potentiometer coupled to the range signal output of said radar system,
    a sine-cosine resolver having a pair of inputs and a pair of outputs with one of said inputs coupled to the output of said A.C. linear potentiometer and the other input thereof connected to the other output of the aforesaid servo motor,
    a distance indicator coupled to one of the outputs of said sine-cosine resolver,
    a reference potentiometer,
    a voltage comparer having a pair of inputs and an output with said inputs respectively connected to the output of said reference potentiometer and the other output of said sine-cosine resolver, and
    a steering indicator connected to the output of said voltage comparer.

3. A system for indicating the position of a ship with respect to a track selected to have a desired relation to a fixed reference point comprising,
    range finder means for providing a first signal representative of the range to a reference point,
    means for determining the angle between the bearing of said reference point and the bearing along a selected track and for producing a second signal representative thereof,
    means for providing a third signal representative of the orthogonal distance from said selected track to said reference point,
    computer means connected to said range finder means, said angle determining means, and said orthogonal distance signal providing means for producing in response to said first, second, and third signals an output signal representative of the displacement of said ship with respect to said track, said computer means including,
    a cosecant multiplier coupled to the outputs of said orthogonal distance signal providing means and to said angle determining means for producing a fourth signal in response to said second and third signals that is proportional to the distance from said selected track to said reference point along a line passing through said ship, means coupled to the outputs of said range finder means and said cosecant multiplier means for comparing said first and fourth signals and producing a fifth signal corresponding to the difference therebetween, a sine multiplier coupled to the outputs of said comparing means and said angle determining means for providing in response to said second and fifth signals an output signal proportional to the orthogonal distance from said selected track to said ship, and indicator means connected to said sine multiplier for indicating the orthogonal distance from said selected track to said ship in response to said output signal therefrom.

References Cited by the Examiner

UNITED STATES PATENTS

| | | | |
|---|---|---|---|
| 2,540,150 | 2/51 | Watts | 235—61 |
| 2,597,349 | 5/52 | Longmire | 343—11 |

OTHER REFERENCES

"Electric Machinery" by Fitzgerald and Kingsley, McGraw-Hill Book Company, 1952, p. 527.

CHESTER L. JUSTUS, *Primary Examiner.*